Dec. 28, 1965   N. A. SAUPPE   3,225,652
REMOTE CONTROL SLIDE PROJECTOR
Filed March 28, 1962   3 Sheets-Sheet 1

INVENTOR.
NORMAN A. SAUPPE
BY
ATTORNEY

Dec. 28, 1965   N. A. SAUPPE   3,225,652
REMOTE CONTROL SLIDE PROJECTOR
Filed March 28, 1962   3 Sheets-Sheet 2
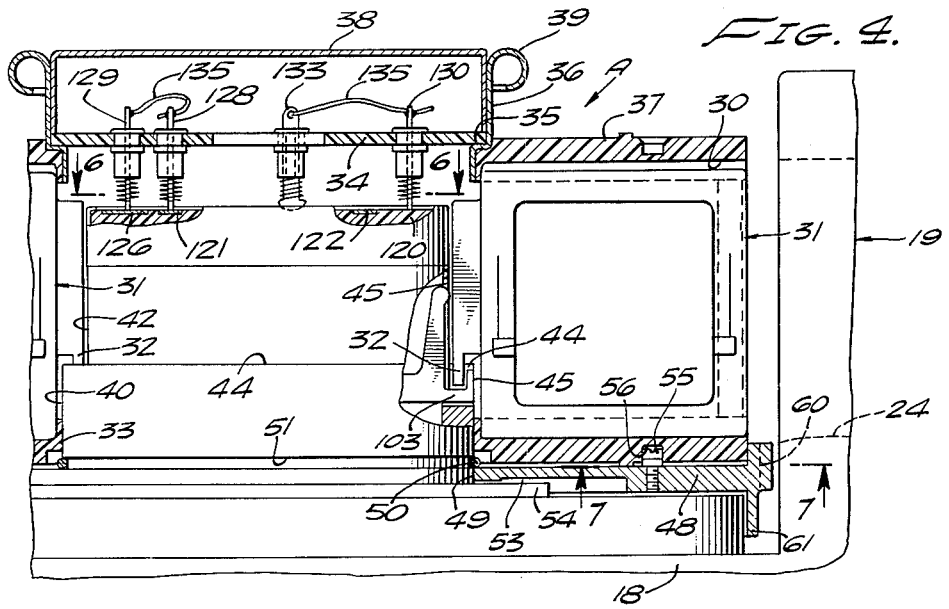
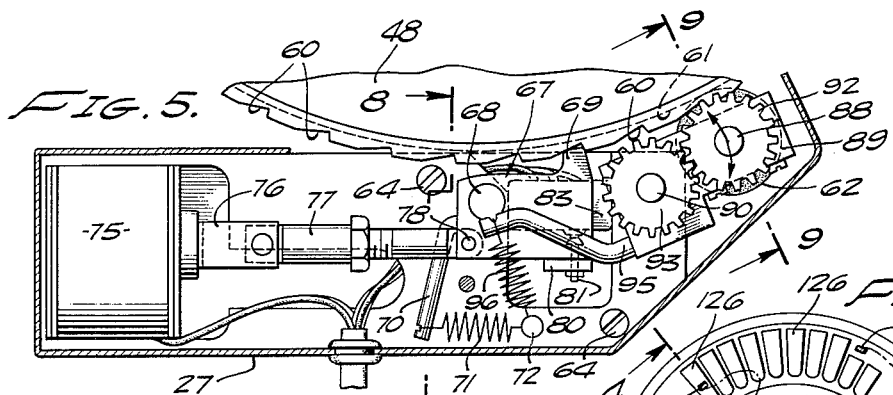
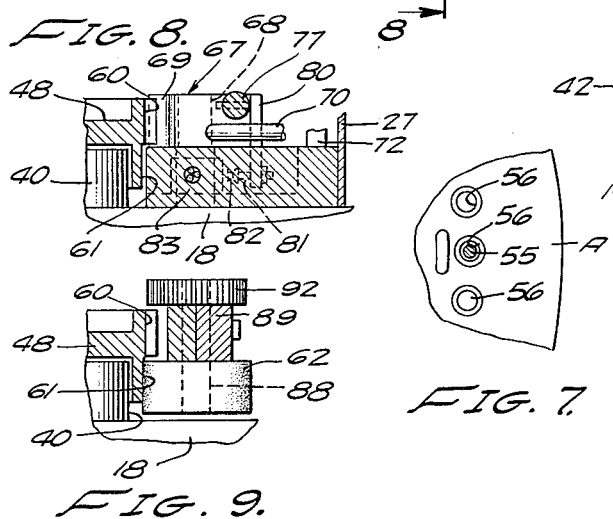
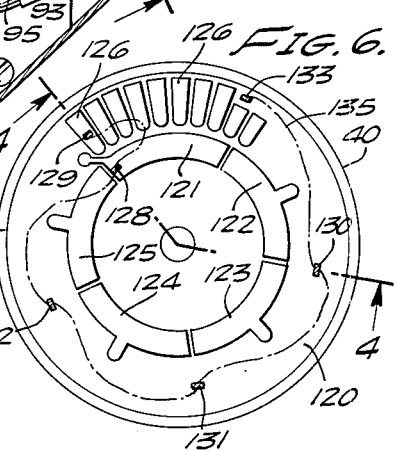
INVENTOR.
NORMAN A. SAUPPE
BY
ATTORNEY tained by locating related pairs of selection contactors on a stationary support for the turntable and in the path of wiping contactors on the juxtaposed interior portions of the magazine.

Other features of the projector relate to constructional details of the magazine turntable rotatable such as the cooperating stop and detent means which are responsive to electrical actuation to control the precise stopping of the magazine opposite the proper loading position for any selected slide.

The digital slide indicator means is of a dual character and includes an indicator positioned for convenient viewing by the audience and indicating the particular slide being displayed as well as the magazine from which it originated. A related adjunct performs the same functions for the projector operator.

Other features of the invention include interlock means for safeguarding against jamming of the projector due to improper or a speedy reversal of the applied operating signals as for example a change of operating instructions to the control mechanism while the first selected instructions are in progress.

Accordingly it is a primary object of the present invention to provide a new and improved automatic slide projector having a remote control station by which the projector can be operated to project any desired slide selected either at random or in succession as filed in the storage magazine.

Another object of the invention is the provision of a slide projector having a plurality of magazines and control means by which any slide can be selected at random from either magazine for projection.

Another object of the invention is the provision of a remote control automatic slide projector having one or more slide magazines resting by gravity on indexing transport means therefor and incorporating selection control mechanism and featuring provision for the fast-action removal and replacement of the magazines at any time without need for operating fasteners or electrical circuit disconnects of any kind.

Another object of the invention is the provision of an automatic slide projector having a slide magazine indexable into any of a series of operating positions to display the slides contained therein in any desired random order and wherein the magazine proper may be removed and reassembled to the indexing support in any position without, however, interfering with resumption of display in predetermined random order.

These and other more specific objects will appear upon reading the following specification and claims and upon considering in connection therewith the attached drawings to which they relate.

Referring now to the drawings in which a preferred embodiment of the invention is illustrated:

FIGURE 4 is a vertical sectional view on an enlarged scale through one of the magazines and its indexing assembly as viewed along line 4—4 on FIGURE 2;

FIGURE 5 is a horizontal sectional view on an enlarged scale taken through the indexing drive for the turntable and the stop mechanism therefor;

FIGURE 6 is a top plan view of the selector contactors taken along line 6—6 on FIGURE 4;

FIGURE 7 is a fragmentary horizontal sectional view of the interlock between the turntable and the magazine as it appears along line 7—7 on FIGURE 4;

FIGURE 8 is a fragmentary sectional view of the turntable stop mechanism taken along the broken line 8—8 on FIGURE 5;

FIGURE 9 is a fragmentary vertical sectional view of the turntable drive taken along line 9—9 on FIGURE 5.

Figure 1:
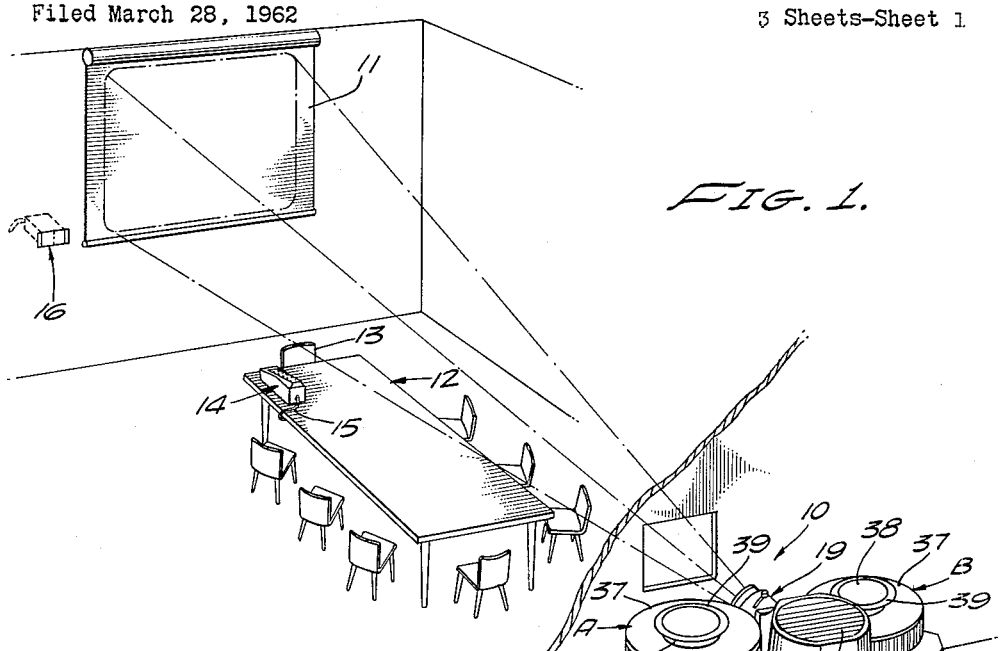
FIGURE 1 is a perspective view of a projector embodying the present invention arranged in one of several typical modes of use and with the projector itself in a separate room from the viewing audience.
Figure 2:
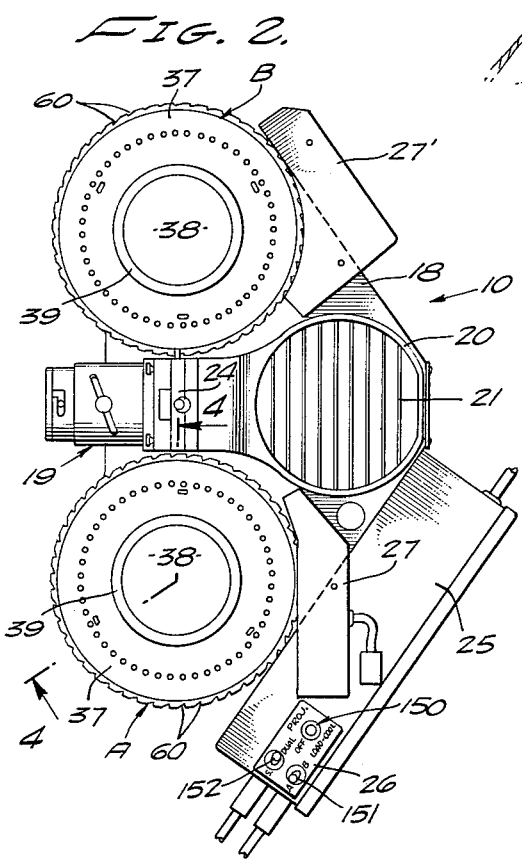
FIGURE 2 is a top plan view of the projector itself shown on an enlarged scale.

Referring more particularly to FIGURES 1 to 2, there is shown a preferred embodiment of the invention comprising the projector unit itself designated generally 10 and arranged to project a slide image onto a screen 11 over the heads of an audience seated about a table 12. The operator of the projector might be seated in chair 13 at the forward end of the table in a convenient position to manipulate the control buttons of the slide selector unit 14. It will be understood the selector box 14 is connected to projector 10 through cabling 15 as is a digital slide identification indicator 16 here shown as mounted in a recess in the room wall adjacent the lower margin of screen 11. If desired, indicator device 16 can be mounted on table 12 or in any other convenient audience viewing position.

Projector 10 includes a main frame or base 18 having any suitable slide projecting assembly 19 positioned centrally thereof and including suitable optical means for transmitting an image from a slide onto screen 11. Projecting assembly 19 will be understood as including a high intensity lamp enclosed within housing 20 having the louvered cover 21 through which cooling air is circulated by a motor-driven fan enclosed within the base of the projector. Spaced laterally to either side of projecting assembly 19 are a pair of slide magazine drums A, B each provided with a large number of radially disposed slide storing cells arranged to be indexed past a slide receiving slot 24 extending crosswise of projecting assembly 19 in accordance with customary practice and in which the slides are seated while being projected onto the screen. Each of the magazines A, B is mounted on an individual turntable arranged to be rotated past slide projecting slots 24 in a manner which will be described in greater detail presently.

The various relays and control components for operating the projector and for transferring selected slides between the magazines and projecting slot are enclosed within an appropriate casing 25 attached to the projector frame 18 and supporting thereon a manual switch panel 26 and attached switches manipulatable by the operator in a manner and for purposes which will be discussed below. Means for locking each of the magazines and for driving the same are mounted on the projector frame closely beside the rim of the respective magazines and are enclosed withing housings 27, 27'. It is pointed out at this time that identical components of the two magazines and of the associated operating magazines are designated by the same reference numerals, those for magazine B being distinguished by the addition of a prime mark.

Referring more particularly to FIGURES 4 to 9, it will be understood that each of the identical slide magazines, as magazine A, includes a cylindrical drum conveniently formed of molded plastic and each provided with radially arranged slide receiving cells 30 opening outwardly through the peripheral wall of the magazines. Slidably seated in each is a rectangular slide having a frame 31 provided along its inner edge with a downturned hook 32 useful in transferring the slides to and from the magazines and in locking the slides within the magazines. To this end, hooks 32 extend radially inward beyond the side wall of a central well 33 opening upwardly through the bottom of each magazine and having a bottom formed by a disc 34. This disc is supported against an inwardly projecting shoulder 35 formed on a sleeve 36 held suitably secured to the upper or top end wall 37 of the magazine. The means here shown for holding disc 34 in this assembled position comprises an inverted cup-shaped member 38 having a snug frictional fit within the upper end of sleeve 36. The upper end of sleeve 36 is curled outwardly to form a rolled handgrip rim 39 by which magazine A may be grasped in the palm of the hand when assembling it to the projector turntable or when withdrawing the magazine therefrom.

The large bore well 33 formed centrally of magazine A has a close telescopic fit over the cylindrical base 40 of a boss 42 upstanding from projector frame 18. It is pointed out that the upper end of the base portion 40 of boss 42 is provided with an upstanding thin annular locking flange 44 encircling boss 42 projecting into the notch of hooks 32 carried by the slides. Locking flange 44 is continuous except for an upwardly opening notch 45 in direct alignment with the slide receiving slot 24 in projecting assembly 19. Notch 45 also extends upwardly along the side wall of boss 42 and provides a passage through which the thin slide transfer lever arm reciprocates while transferring a slide from the magazine into slide receiving slot 24 of the projecting assembly. The slide transfer mechanism will be described below.

It is also pointed out that notch 45 permits hook 32 of the individual slides to become disengaged from locking flange 44 of the stationary boss 42. The locking tangs or hooks 32 of all slides except one present in the magazine are normally engaged or interlocked with locking flange 44 and are held thereby against displacement from the magazine storage cells 30.

Magazine assembly A seats against the upper surface of a turntable ring 48 having a central opening 49 fitting about the enlarged base 40 of a boss 42. The turntable is held detachably assembled to base 40 by a spring keeper ring 50 seating in an annular groove 51 and rotates on ball bearings 53 held captive in depressions formed in a retainer plate 54. Screwed into a threaded bore of turntable ring 48 is a locator screw 55 the head of which is receivable in any one of the annular row of locator recess 56 formed in the bottom of the magazine, there preferably being a separate locator recess 56 located in predetermined position below each slide receiving cell 30 of the magazine. The rim edges of recesses 56 may be beveled to facilitate seating the magazine over the head of locator screw 55. From the foregoing it will be understood that when assembling the magazine onto the turntable, the operator merely lowers it over boss 42 until the magazine comes to rest on the turntable following which it is rotated to the slight extent necessary to assure that the locator screw 55 seats in any adjacent one of recesses 56. When so seated it is known that the slides within the magazine are precisely located with respect to each of the turntable indexing positions or notches.

Another feature of the turntable is the fact that its flanged rim includes a plurality of locator notches 60 (FIGURE 5) of the general contour shown, there being one such notch opposite each slide seating cell 30 of the magazine. These notches seat the locking pawl serving such an important function in the accurate indexing of the turntable and the details of which will be described below. Located below notches 60 is an annular smooth-surfaced driving flange 61 integral with the turntable and engaged by the resilient covering on the periphery of the turntable drive pulley 62 (FIGURE 9).

The indexing control for turntable 48 will now be described with particular reference to FIGURES 5, 8 and 9. The housing 27 for these components is accurately secured to projector frame 18 as by screws 64. The L-shaped heavy-duty pawl 67 is journalled to the base of the housing 27 by a vertical pivot pin 68 with pawl tooth 69 positioned to engage within any individual notches 60 on the rim of the turntable. The outer end of an arm 70 rigidly secured to pawl 67 supports a tension spring 71 having its other end anchored to a pin 72, the spring 71 being effective to urge tooth 69 of the pawl into firm seating engagement with a notch 60. The pawl is disengageable from notches 60 by energizing a solenoid 75 mounted within housing 27 and having an armature 76 connected through link 77 of adjustable length to pawl 67 by means of a pin 78. When de-energized, the solenoid armature is held in its extended position by spring 71. However, when the solenoid is energized the armature is attracted to the left as viewed in FIGURE 5 thereby pivoting the pawl out of the notch 60 in which it is then seated thereby releasing turntable 48 for clockwise rotation.

Referring more particularly to FIGURES 5 and 8, it is pointed out that pawl 67 also operates a microswitch. To this end an arm 80 rigidly secured to the edge of pawl 67 supports adjustable bolt 81 at its lower end having a head positioned to contact the operating plunger of a double-throw microswitch 83. Accordingly, it will be understood that movement of pawl 67 between its locked and unlocked positions is accomplished by energizing and de-energizing its operating solenoid 75 and acts additionally to shift the microswitch 83 from its closed position in one direction to an alternate closed position. In one of its closed positions switch 83 is effective to energize the turntable drive motor whereas in its alternate position it is effective to energize a motor operating the slide transfer mechanism. These motor and the control circuits therefor will be described below.

Referring now to FIGURES 5 and 9, it is pointed out that the turntable drive pulley 62 is fixed to a shaft 88 extending upwardly through an arm 89 pivotally supported about shaft 90 of the turntable drive motor 91, the latter being located within projector housing 18. A drive gear 92 keyed to the upper end of shaft 88 meshes with a gear 93 keyed to the motor drive shaft 90. An arm 95 secured to and forming an extension of arm 89 supports one end of a tension spring 96 anchored to pin 72 and is effective to pivot arms 89 and 95 counterclockwise about the axis of motor shaft 90 thereby to press drive pulleys 62 against the driving flange of turntable 48.

*The slide transfer mechanism*

Figure 10:
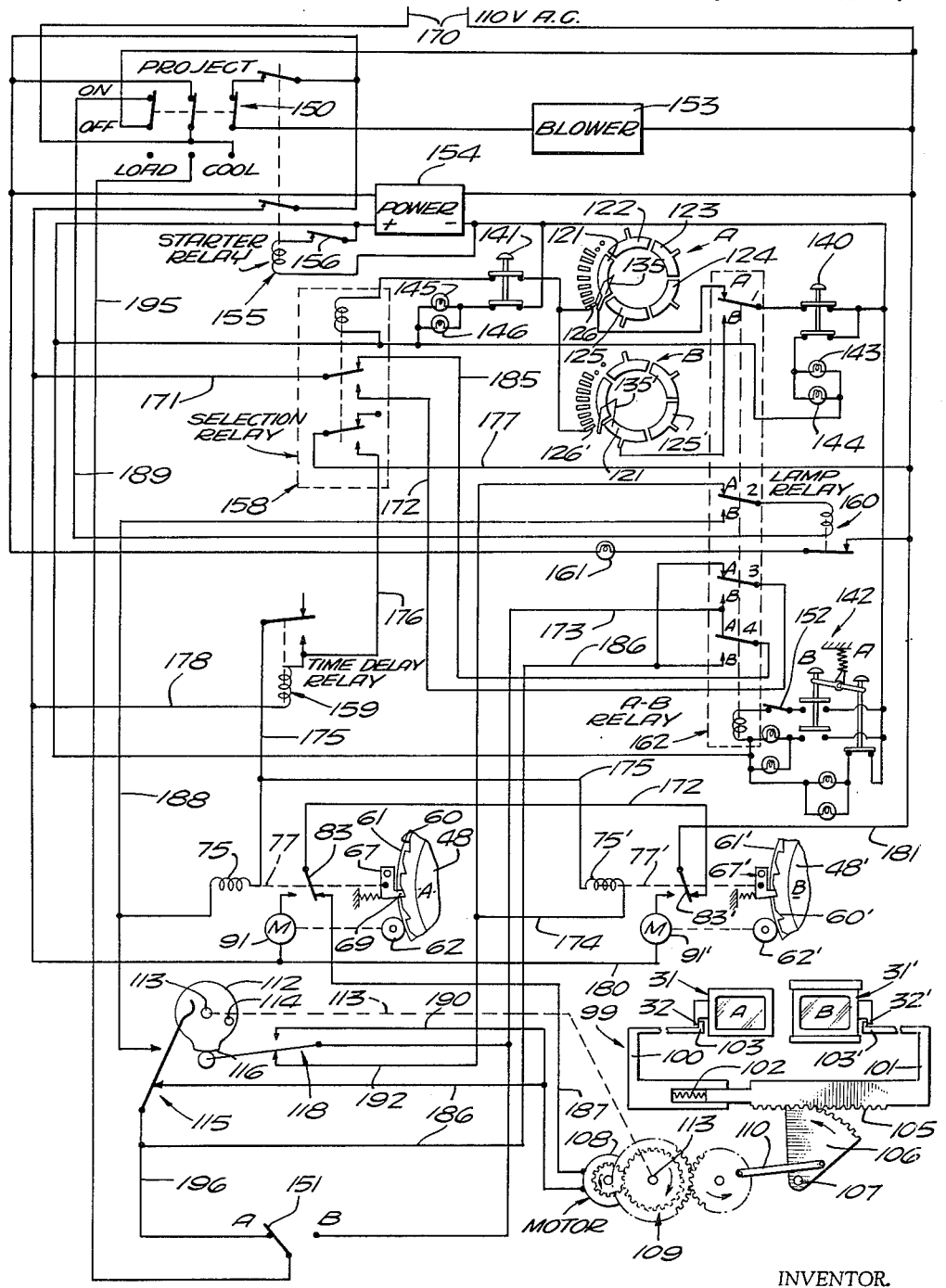
FIGURE 10 is a fragmentary schematic of the control circuitry for the projector but showing only one of the units and one of the tens slide selection switches and the associated indicator pilot lamps.

The transfer mechanism 99 for shifting these slides back and forth between the two magazines and the slide projecting slot 24 of assembly 19 is shown schematically in its essential operating aspects in the lower right-hand corner of FIGURE 10. This mechanism includes a pair of rigid U-shaped members 100, 101 facing toward one another and lying in a vertical plane diametrically of the two slide magazines A, B. The lower leg of member 100 is telescopically engaged with the adjacent lower leg portion of member 101 and includes a compression spring 102 urging the two members horizontally away from one another and against a lost motion limiting stop, the purpose of this lost motion resilient connection being to compensate for overtravel of member 101 under the driving action of its actuating motor. The upper leg of each member is provided with a hook 103, 103' engageable behind the complementally shaped downwardly directed hooks 32, 32' of the slides in magazines A and B. It will be understood that in all index positions of the two magazines, hooks 103, 103' of the particular two slides then aligned with the transfer mechanism 99 will be engaged behind the hooks of a slide in respective magazines A and B. Also of importance is the fact that in any index position of the two magazines, a slide from one magazine is always located in projecting position within projecting assembly 19, whereas the other transfer hook is always engaged with a slide positioned in one of the magazines. As shown in FIGURE 10, transfer mechanism 99 is located to the right-hand end of its path of travel and a slide from magazine A is located within the projector while the other slide engaged with hook 103' is fully seated in magazine B. Consequently, upon reverse shifting movement of the transfer mechanism, slide A will be transferred back into magazine A while the engaged slide from magazine B will be transferred into the projecting assembly, it being understood that the transfer mechanism always operates from one to the other of its two extreme positions and then dwells there until receiving a signal for the next operating movement.

One of the two U-shaped transfer members, as member 101, is provided with rack teeth 105 on its lower edge engaged with the teeth of a driving sector 106 mounted on a stationary pivot shaft 107. The driving motor 108 for the slide transfer mechanism is coupled through speed reduction gearing 109 and a crank 110 to reciprocate sector 106 back and forth about pivot pin 107. The described to-and-fro movement of transfer mechanism 99 is under the control of a cam wheel 112 fixed to shaft 113 of the speed reduction gearing. Cam wheel 112 carries a pin engageable with the operating lever of a two-position switch 115 while a boss 116 on the periphery of cam wheel 112 operates a two-position control switch 118. The manner in which cam wheel 112 operates switches 115 and 118 to limit travel of the slide transfer mechanism as well as to control energization of solenoids 75, 75' will be described in greater detail in connection with the projector control circuit.

*The slide selector contactors and their disposition relative to the slide magazines*

The simple but highly effective arrangement of the slide selector contactors and the manner in which these are mounted partly within the magazine drums and partly within the stationary bosses projecting into the magazine wells will now be described by the aid of FIGURES 4 and 6.

Magazines A and B as shown herein are equipped to store 48 slides respectively, or a total 96. The manner in which any particular slide in either magazine is designated and in which the magazine containing the designated slide is indexed into the proper position to dispense this slide into the projecting assembly forms a most important feature of the invention and involves the construction and operation of the contactors now to be described. Before proceeding to do so it is pointed out that the slides of each magazine are arbitrarily divided into groups of ten. For each of these groups there is an elongated arcuate group or "tens" contactor, the several group contactors being arranged in a circle and supported in an insulated member mounted in the top of stationary boss 42 of the projector frame. Disposed radially opposite one of the group contactors is an arcuate row of ten contactors known as "units" contactors and each respresenting a particular one of the slides of a tens group. Referring to FIGURE 6 representing a top plan view of boss 42, it will be noted that an insulation disc 120 is suitably supported within the upper end of the boss. Embedded within insulation 120 are five identical tens contactors 121, 122, 123, 124, 125, or one for each group of ten slides within magazine A. Arranged exteriorly along the edge of one of the tens contactors, as contactor 121, are ten individual units contactors 126, the end two of which are shorter than the remainder for purposes to be described later. Of importance is the fact that each of the units contactors 126 is spaced apart circumferentially of the boss by the same distance as are the slide cells 30 within the respective magazines.

Overlying the described units and tens contactors are a number of bridging contactors mounted in the disc 34 forming the bottom of magazine well 33. These bridging contactors are so positioned and connected as to complete a circuit between a particular one of the tens contactors 121 to 125 and a particular one of the units contactors 126 as the magazine is indexed about boss 42.

These bridging contactors include wiping conductors resiliently supported in disc 34 and arranged in three concentric rows, including a single inner contactor 128, four intermediate contactors 129, 130, 131 and 132, respectively, and a single outer contactor 133. Inner contactor 128 wipes over the group of tens contactors 121 to 125; the intermediate ones 129 to 132 wipe over each of the units contactors 126 including the two radially short contactors, and the outer contactor 133 has wiping contact with all of the units contactors except the two radially short ones. Each of the described wiping contactors 128 to 133 are electrically interconnected by a common conductor wire 135.

In view of the foregoing, it will be apparent that as the magazine and the wiping contacts carried thereby rotate relative to the stationary units and tens contactors strips on boss 42, the interconnected wipers 128 and 129 will close a circuit instantly that they simultaneously contact an energized pair of units and tens contactors. By the time the magazine has been rotated sufficiently to carry wipers 128, 129 to the one o'clock position (as viewed in FIGURE 6) these wipers will be out of range for selecting slides represented by the tens contactor 121. Further clockwise rotation of the magazine renders wipers 132, 131, 130 and 133 successively effective to search the units contactors as respects successive ones of the tens contactors. For example all ten slides represented by tens contactor 122 are next searched by contactor 128 as the latter moves along contactor 122 and as contactor 132 connected in circuit therewith passes successively over units contactors 126. Accordingly, rotation of the magazine from the one o'clock position to the three o'clock position will be effective to designate one of the particular sides within the second tens group. Each of the other tens contactors 123, 124 and 125 will be brought within the selective range of the wipers 131, 130 and 133 in succession and in that order as the magazine continues to rotate clockwise as viewed in FIGURE 6. It is also pointed out that since each magazine is provided with only 48 slides, or two less than five groups of ten, the last two units contactors 126 are foreshortened so as not to be contacted by wiper 133, it being recalled that wiper 133 is the only one spaced sufficiently from the axis of rotation as not to contact the two radially short units contactors.

*The control circuit*

Referring now to FIGURE 10 showing the essential details of the electric circuitry and the associated components for controlling the operation of projector assembly 10, it is pointed out that the illustrated portion of the wiring circuit is that required to select the first slide in each of magazines A and B. The unshown circuits include only those required to select 2 to 48 of each magazine which unshown circuits are but a duplication of certain of the connections shown in FIGURE 10 and constituting the electric leads between the units and the tens buttons of control box 14 and the selector contactors of magazines A and B, as well as the connections to each of the indicator lamps part of which are located in control unit 14 and part of which are located in the slide indicator device 16 (FIGURE 1).

Figure 3:
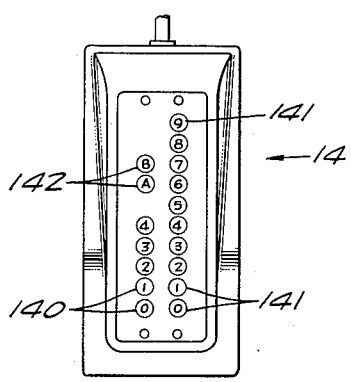
FIGURE 3 is a plan view on an enlarged scale of the remote control for the projector.

Referring now to FIGURE 3, it is pointed out that control box 14 is provided in its top wall with five tens buttons 140 and ten units buttons 141. Each of tens buttons 140 will be understood as controlling as associated double-pole switch one portion of which is used to energize a particular one of the tens contactors 121 to 125 of either magazine and the other of which energizes a pair of pilot lamps 143, 144. Likewise, each of tens buttons 141 controls a pair of switches one of which is effective to energize a particular one of the tens contactors of each magazine, whereas the other energizes a pair of pilot lamps 145, 146 having the same functions as pilot lamps 143 and 144.

Control box 14 is also provided with a third set of buttons 142 one of which is designated A and the other B. These buttons are known as the magazine selector buttons and are mechanically interconnected to operate switches of the type schematically indicated in FIGURE 10 and are effective, as will appear more fully hereinbelow, to select either magazine A or magazine B as the magazine from which the next slide is to be projected. Associated with each of selector buttons A and B are a pair of pilot lamps (FIGURE 10) one of each pair of which is located in the control box and the other of which is located at the digital indicator device 16. The lamps associated with the two buttons are preferably distinctively colored, as green, to designate magazine A whereas the other have a different distinctive color, as red to designate magazine B, there being one lamp of each color in box 14 and one in indicator 16. When magazine A is to be used, button A is depressed to close the associated switch thereby energizing the green lamps. This illumines the A button with a green light and similarly colors the viewing screen of indicator 16. It may be pointed out at this time that the caps for each of the buttons in control box 14 is preferably translucent so that the colorless pilot lamp associated with each illuminates the particular button activated at any time.

Before describing the operation of the control circuit, a brief description will be given of the auxiliary components and relays forming essential parts of this circuit. Thus, the projector includes a manually operated main switch 150 which is of the double-throw, triple-pole type and has an operating handle mounted in panel plate 26 secured to the top of housing 25 (FIGURE 2). When closed upwardly, this switch conditions the circuit for normal operation to project slides, whereas when it is closed in the opposite direction, the projector is conditioned for either loading or demounting of the magazines for servicing. In the intermediate position of switch 150, all circuits controlled thereby are open.

A third switch 151 mounted in switch mounting panel 26 is operable to control slide transfer mechanism 99 provided main switch 150 is first closed downwardly to its loading position. Switch 151 (at the bottom of FIGURE 10) can then be manipulated to energize the slide transfer motor 108 to assure that the slides of the particular magazine to be detached are first transferred into the magazine before it is removed from the projector. Thus, assuming that the operator desires to remove magazine A while one of its slides is present in the projector as main switch 150 is closed downwardly to its loading position. In this case, he makes certain that switch 151 is closed to its A or left-hand position thereby energizing slide transfer motor 108 to shift the slide from the projector back into magazine A. Upon completion of this operation, the operator removes magazine A along with its full charge of slides.

Other important components of the control circuit include a motor-driven air blower 153 located within the projecting lamp housing 20; an A.C. to D.C. power converter 154; a starter relay 155 having a normally closed manual switch 156 connecting it in circuit across the D.C. power outlets of converter 154; a slide selection relay 158; a time delay relay 159; a lamp relay 160 controlling the power supply to the slide projection lamp 161; and a selection relay 162 for determining which of the magazines will supply the next slide to the projector.

The following characteristics of the several relays will be helpful in understanding the operation of the control circuit. Thus, the two circuits controlled by starter relay 155 are closed only when the manual switch 156 is closed and power is being supplied to power converter 154. The contactors of slide selection relay 158 are normally closed downwardly when the relay is de-energized and close upwardly only when the relay is energized, a condition existing only when one or the other magazine has rotated into position for the transfer of a selected slide into the projecting assembly. Time delay relay 159 is normally open as shown in FIGURE 10 and its contactor closes slowly a measured time interval of ½ to 1 second after its coil is energized. The time delay constant of the relay of one-half to one full second safeguards against starting of the turntable drive motors 91, 91' while the slide transfer mechanism is still in movement and thereby avoids the possibility of jamming the turntables and the slides carried thereby. The lamp relay closes the projection lamp circuit to lamp 161 each time this relay is energized, whereas the magazine selection relay 162 reverses the position of its numerous contactors each time it is energized and de-energized. The power supply to the magazine selection relay is controlled by selector switch 142 having a pair of buttons designated A and B, respectively, interconnected by a toggle bar and effective to hold the switches actuated thereby in one of two positions depending upon which of its operating buttons A or B is depressed. The spring biasing these buttons is effective to hold either button in its lower position in accordance with toggle switch technique well known to the art.

*Operation with random slide selection first from magazine A and then from magazine B*

Let it be assumed that the projector is set up and ready for projection of slides from the fully charged cells of both magazines. Also let it be assumed that power is supplied from a standard 110 volt A.C. source as is indicated at 170 at the top of FIGURE 10. First main power switch 150 is shifted to its "on" position to supply power to the projector and to the A.C.-to-D.C. power converter 154 as well as to air blower 153. Let it further be assumed that manual switch 156 on the outlet side of converter 154 is closed to energize starter relay 155 to close its contacts controlling the supply of direct current to the various components energized thereby.

In the position of the parts shown in FIGURE 10, slide No. 01 from magazine A is located in the projector and the lamp relay 160 is energized to supply power to projection lamp 161. Under these conditions the units button 141 is lighted by its uncolored pilot lamp 145 and the corresponding lamp 146 of the digital readout indicator 16 is also lighted thereby indicating to the audience that slide No. 1 is being exhibited. Also button A of the magazine selector switch 142 is depressed and the characteristic green colored light illuminates the A button of the control box 14, as well as the screen of indicator 16.

Now let is be assumed that the operator wishes to project slide No. 01 from magazine B. To do so, he first depresses button B of magazine selector switch 142 thereby opening the previously closed switch associated with the A button and shifting the B button to its alternate or closed switch position, the switch being held in the alternate position by the action of the spring forming part of the toggle operating mechanism of switch 142. Depression of the B button de-energizes the green indicator lamps for the A switch and closes the red indicator lights of the B button thereby indicating that the B magazine is to be operated next. Not only is the B button illuminated in red but so is the screen of indicator device 16 thereby notifying the audience that the B magazine is being used. Depression of the B button also closes the circuit through the magazine selection relay 162 to shift the four movable contactors of this relay from the upper to the lower closed positions thereof, thereby conditioning the apparatus for the projection of one or more slides from the B magazine. All that remains is for the operator to select a slide to be projected. Assuming that slide number one is the selection, the operator depresses units button No. 1 in control unit 14 and the tens zero button. The tens button, represented by character 140 in FIGURES 3 and 10, has its right-hand switch contact connected to the negative bus of the D.C. power supply 154 and its left-hand contact connected through the upper but downwardly closed contact of A–B relay 162 to the zero group of tens contactor 121'. Also, the right-hand upper switch contact of the No. 1 units button, represented by character 141 in FIGURES 3 and 10, is permanently connected to the first one of the units contactors 126' of magazine B, its left-hand side being connected to the upper lead of the slide selection relay 158. The lower lead of this relay is connected through lead 170 to the plus side of the D.C. power supply.

At this time, relay 158 is not energized because the bridging contactors 135' of magazine B are not in position to bridge and close the circuit between tens contactor 121' and units contactor 126'. Accordingly, the contacts of relay 158 remain closed downwardly. Accordingly, current now flows from one side of the A.C. supply through lead 171, the downwardly closed upper contact of selection relay 158, lead 172 through the downwardly closed No. 3 contact of relay 162, through lead 173 to the movable contact of microswitch 118, through its lower contact and lead 174 to solenoid 75', and thence through lead 175 to the downwardly closed contact of time delay relay 159 and along lead 176 through the downwardly closed lower contact of selection relay 158, and through lead 177 to the other side of the A.C. power supply. Normally, the contactor of time delay relay 159 is open as shown in FIGURE 10, but this relay is energized to close its contactor as an incident to de-energization of selection relay 158, the current supply being through lead 177 and the lower contactor of relay 158, lead 176, through the relay and to the other side of the supply source via lead 178. As has been pointed out, the time delay relay closes downwardly slowly and after a delay of one-half to one second. However, as soon as it does close, the above-described current flow takes place thereby energizing solenoid 75' to retract turntable pawl 67 and reverse the position of microswitch 83' to start turntable motor 91'. In other words, energization of the solenoid retracts pawl 67' thereby freeing the B magazine turntable 48' for rotation by its drive motor 91' and drive pulley 62'. The power supply to motor 91' is derived through lead 180 and flows through the motor, through the left-hand contact of switch 83' and back to the other side of the power supply via lead 181.

The turntable now continues to rotate carrying with it the magazine and bridging contactors 135'. As soon as the bridging contacts close against zero contactors strip 121' and the units contactor 126', the circuit is closed to energize selection relay 158 and close its two movable contacts upwardly thereby de-energizing solenoid 75' allowing the spring 71' to seat pawl 67' within the underlying notch 60'. This action positively locks turntable 48' and its interlocked magazine against rotation and with the selected slide No. 01 opposite its transfer position into the slide projecting station.

Slide transfer mechanism 99 is automatically activated at this point to transfer slide No. 01 from magazine B into the projecting station. The power to drive slide transfer motor 108 is derived from the left-hand side of the power circuit and flows through lead 171 to the upwardly closed upper contactor of selection relay 158, thence through lead 185 to the lower and downwardly closed number 4 contactor of A–B relay 162, along lead 186 to microswitch 115 now closed to the right, along lead 186 to motor 108 and thence along lead 187, through microswitch 83, along lead 172, through microswitch 83' and along lead 181 to the other side of the power supply. The energized motor 108 now operates through its gearing to drive link 110 and toothed sector 106 to shift slide transfer members 100, 101 to the left thereby simultaneously retrieving the slide present in the projector back into magazine A while shifting slide No. 01 from magazine B into the projecting station. Since the transfer motor is connected by shaft 113 to rotate cam member 112, it will be understood that the retrieval of slide B into the magazine occurs as pin 114 on disc 112 contacts microswitch 115 to close it to the left. Before switch 115 closes to the left it will be understood that the high section 116 on cam disc 112 rotates clockwise allowing the follower roller of microswitch 118 to close the latter upwardly. The described reversal of switch 115 discontinues the power supply to motor 108 leaving slide A in its magazine and leaving slide No. 01 of magazine B in the projecting station; additionally the reversal of microswitch 115 energizes the projection lamp. Thus, as switch 115 closes to the left, current flows through lead 188 to lower contact of A–B relay contactor No. 2, thence through the coil of lamp relay 160, and through lead 189 back to the other side of the power source by way of main power switch 150. The energization of lamp relay 160 then closes the power circuit to the projection lamp 161.

Let it now be assumed that the operator wishes to show the next slide from magazine A. Inasmuch as the duplicate circuits for each of the slides of this magazine have been omitted for simplicity of illustration, we will assume that slide No. 01 of magazine A is the one selected. It will be recalled that magazine A was already in position to dispense slide No. 01. Accordingly, throughout the period of use of magazine B, locking pawl 67 of the A magazine remains seated in the notch 60 corresponding to slide No. 01; for this reason the A magazine has remained locked and in position to again display its slide No. 01. Irrespective of this fact, to display any slide from magazine A the operator must first condition the projector for this purpose which is done simply by depressing the A button of the magazine selector switch 142. This de-energizes the A–B relay 162 allowing its four contactors to close upwardly. The selection relay is momentarily de-energized but since bridging contact 135 of the A magazine is already positioned to complete a circuit through its "zero" tens contactor 121, and the No. 1 units contactor 126, relay 158 is immediately re-energized to retain its two contactors closed upwardly. It will be recalled that the last position of slide transfer motor 108 was with microswitch 115 closed to the left and microswitch 118 closed upwardly. Hence, motor 108 is energized immediately to transfer slide No. 01 (derived from magazine) back into the B magazine while simultaneously transferring slide No. 01 from the A magazine into projecting position. The circuit by which this is accomplished includes the upper contactor of selection relay 158, lead 185, the upwardly closed No. 4 contactor of A–B relay 162, lead 173, the upwardly closed contact of switch 118, lead 190, motor 108, lead 187, the two microswitches 83, 83′, lead 172 and lead 181. As A magazine slide No. 1 becomes seated in the projector, projection 116 of cam 112 closes switch 118 downwardly thereby de-energizing slide motor 108 and supplying power through lead 192 and the upwardly closed contactor No. 2 of the A–B relay to lamp relay 160 thereby re-energizing the projector lamp circuit.

Had magazine not been in the proper position to load slide No. 01 into the projecting station, the operator would have depressed the tens zero button and the units 01 button thereby conditioning the slide selector contactors to energize the selector relay as soon as magazine A is rotated into the proper loading station for slide No. 01, i.e., when bridging contactor 135 makes contact with zero tens contactor 121 and the first one of the units contactor 126.

It should also be pointed out at this point that the depression of both zero buttons operates on the starter relay to open switch 156 thereby to place the system in standby condition with only the power converter assembly energized.

It will also be understood that the conventional control box 14 is so constructed that only one units and one tens button can be depressed at any one time. Also the depression of the 4th tens button and the ninth units button is preferably arranged to lock both magazines out of operation. Likewise manually actuated switch 152 is operable when open to deactivate magazine B as is desirable when only magazine A is used and is charged with slides. This safeguards against an accidental attempt to load a slide from empty magazine B through preventing the rotation of the turntable ring 48′ which carries that magazine.

*Detachment of the magazines for servicing*

Let it now be assumed that the operator wishes to remove the A magazine from the projector for some reason.

The first step is to reverse the position of main switch 150 to close it downwardly. This deactivates the power supply to power converter 154 to discontinue the supply of D.C. to all components in circuit therewith. However, A.C. power continues to be supplied to the blower fan 153 to circulate cooling air over the projection lamp. In addition, A.C. power is supplied from main switch 150 through lead 195 to a circuit containing a magazine selector switch 151.

Before removing either magazine it is important that all slides of that magazine be in their proper cells and that none be present in projector assembly 19. Since slide 1 of magazine A is now in the projector it is first necessary to return this slide into the magazine. Accordingly, the operator shifts switch 151 to its "A" position as indicated by the letter A thereon. Current now flows from the downwardly closed main switch 150, through lead 195, switch 151, lead 196 to the blade of switch 115 now closed to the right. The current then flows through lead 186 to motor 108 and back to the other side of the line through lead 187, switch 83, lead 172, switch 83′ and lead 181. Mechanism 99 now functions to return to magazine A while inserting a slide from magazine B into the projector. As soon as the slide has been returned to magazine A, motor 108 is de-energized by the opening of switch 115, but shortly before this occurs, microswitch 118 controlling the operation of the transfer motor 108 has been closed upwardly thereby conditioning the transfer motor circuit to relieve the B magazine back into its magazine subject only to the shifting of switch 151 to its "B" position; following the second retrieval operation, the B magazine can also be removed, leaving both turntables unoccupied. It would, of course, be understood that the retrieval of the second slide is delayed until magazine A has been detached from its turntable. Before lifting either magazine from the turntable, the operator takes the precaution of placing a guard band around the periphery of the magazine to prevent accidental loss of slides from their respective cells.

Let it now be further assumed that the operator performs some service work and is ready to return magazine A to its turntable. This is accomplished merely by placing the magazine over boss 42 and twisting it to the right or the left, if necessary, until locator 55 on the turntable seats in any one of the recesses 56 arranged about the bottom of the magazine. Before removal of the magazine slide No. 1 was aligned with the projection slot 24. Constituting the slide projecting station let it be assumed that when the magazine was returned haphazardly to the turntable slide No. 46 rather than slide No. 1 is the one aligned with the projecting station. This fact in no wise interferes with the ability of the equipment immediately to locate and select any slide, as slide No. 1 for insertion since a magazine is brought automatically back into its proper aligning position without need for the operator performing any special operation. This is accomplished merely by re-closing main switch 150 in its upper or normal operating position. Since the control buttons of box 14 have not been disturbed, the projector is conditioned for the selection, loading and projection of slide No. 1 from the magazine in the following manner.

Since the A magazine is out of its proper projecting position, its bridging contacts 135 are open circuited and power supply to selection relay 158 is incomplete. Hence, this relay is closed downwardly. It will be recalled that in the last-described position of slide transfer control cams 112, switch 115 was closed to the left, as is necessary for all slides to be stored within magazine A. Accordingly microswitch 115 is correctly positioned to activate locking solenoid 75 of the A magazine.

Power for energizing solenoid 75 is derived through lead 171, the downwardly closed upper contactor of selection relay 185, lead 172, the upwardly closed No. 3 contactor of A–B relay 162, lead 186, switch 115 closed to the left, solenoid 75 and through the downwardly closed contactor of time delay relay 175, lead 176, the downwardly closed lower contactor of relay 158 and back to the other side of the line via lead 177. The activation of solenoid 75 closes the turntable control switch to the left to drive the turntable until bridging contactors 135 complete the selection relay power circuit through tens contactor 121 and the No. 1 units contactor 126 of magazine A. This instantly energizes selection relay 158, thereby discontinuing the power supply to solenoid 75, closing switch 83 to the left, and allowing pawl 67 to lock the turntable against rotation. Switch 83 now supplies power to motor 108 to transfer slide No. 1 from the magazine into the projector whereupon the lamp relay closes to energize projection lamp 161.

It is therefore seen that the magazines can be removed and replaced in any position whatever without confusing the controls or affecting the proficiency of these to locate and load any desired slide into the projector automatically and without any special preliminary operation.

While the particular remote control slide projector herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A remote control image projector of the type having a projection light and lens assembly for projecting an image onto a screen in enlarged form, that improvement which includes rotary magazine means for normally compactly storing a series of images on image-bearing media in close side-by-side relation in readiness for transfer into projecting position in said image projecting assembly, remote control means operable to rotate said magazine means until an individual image selected successively in any random order is in a predetermined position and for thereupon transferring the selected image edgewise in the plane of said image for a distance not substantially greater than the length of the image-bearing media and individually into projecting position in said image projecting assembly and including means for retrieving a previously selected image back into a predetermined storage position therefor in said magazine before permitting said magazine to rotate to a position for displaying the next image selected at random.

2. An image projector as defined in claim 1 characterized in that said image magazine means and the remote slide selection and transfer means includes power means operable to move said magazine means bodily relative to said image projecting assembly to align a selected image laterally opposite the image projecting position thereof in said projecting assembly, and means for locking said magazine means in said last mentioned position while the selected image is being transferred edgewise into said projection assembly and returned to its former position in the magazine.

3. An image projector as defined in claim 2 characterized in the provision of means for energizing said image projecting light only while an image is centered in said projecting assembly.

4. An image projector as defined in claim 1 characterized in that said magazine means includes a power-driven turntable detachably supporting said magazine means and in that the latter comprises a circular storage drum for storing a plurality of image-bearing slides therein, said drum having radially disposed slide supporting cells opening outwardly through the periphery thereof and through which openings slides may be inserted and withdrawn, and said control means including power-operated reciprocable slide transfer means for transferring a selected slide between a cell therefor in said magazine and said slide projecting assembly.

5. An image projector as defined in claim 1 characterized in the provision of electrical indicator means operatively associated with said control means and operable to energize a signal visible to the observer of the projected image and identifying and distinguishing a particular image from all others in said magazine means.

6. An image projector as defined in claim 1 characterized in that said image magazine means comprises a power-driven turntable and a readily removable circular drum containing a ring of image-bearing slide receiving cells arranged about the peripheral portion thereof, said circular drum resting on said turntable and being removable therefrom by lifting the same away from said turntable, and readily separable interlock means between said drum and said turntable for causing said drum to interlock and rotate with said turntable when resting thereon in any one of a plurality of different positions and for assuring precision alignment of the slide cells in the drum with said turntable in each of a plurality of different interlockable positions.

7. An image projector as defined in claim 1 characterized in the provision of positive brake means for said turntable operable to position the turntable and a slide cell of said drum in accurately aligned planar relationship with a slide projecting position within said slide projecting assembly to facilitate trouble-free transfer of a slide between said drum and said projecting assembly.

8. An image projector as defined in claim 1 characterized in the provision of a plurality of independent slide magazine means individually removable as a unit from said projector and located laterally to either side of said image projection assembly and further characterized in that said remote control means is operable at the user's option to select and to project any desired image-bearing slide at random from any one of said magazine means.

9. In a slide projector for use in projecting a magnified image on a viewing screen, said projector having a slide projecting assembly, a power-driven turntable positioned closely adjacent one side of said projecting assembly, a plurality of stationary electrical contactors supported on said projector in close proximity to said turntable, a magazine drum having a plurality of slide seating cells opening through the wall thereof and movable past a transfer position with respect to said slide projecting assembly, power-driven means operable to transfer a slide between said drum and projecting assembly, control means including selection means for said projector including connections to the drive means for said turntable and for said slide transfer means, said control means including electrical conducting means carried by said magazine for contacting said contactors as said magazine rotates relative thereto, and brake means for said turntable controlled by the completion of an electrical circuit through said contactors and the means in said magazine drum to assure stoppage of said magazine drum in accurate slide transfer position with respect to said slide projecting assembly as said drum rotates to the proper position for the transfer of the selected slide into projecting position.

10. A remote control slide projector having a main frame supporting image projecting means thereon, slide magazine means movably supported on said main frame transversely of a slide transfer position between said magazine and said image projecting means and including means for moving said magazine means therepast, a series of stationary contactors, other contactors movable with said magazine means and traversing said stationary contactors as said magazine is indexed therepast, a plurality of normally open slide selection switches in circuit with said stationary contactors, and means responsive to the arrival of the selected slide at its projection transfer position to lock said magazine against movement and to transfer the selected slide into projecting position.

11. A slide projector as defined in claim 10 characterized in that said slide magazine means includes a unitary slide magazine and a movable support therefor, and further characterized in that said unitary slide magazine is readily detachable from said movable support along with the contactors movable therewith.

12. That improvement in a remotely controlled slide projector which comprises a cylindrical slide magazine having a well opening axially through its lower end and adapted to seat over a complementally shaped boss of a projector assembly, said magazine having a plurality of radially disposed slide receiving cells arranged about said well and opening through the outer rim of said magazine, and a plurality of electrical contactors mounted in the bottom of said well and having resiliently supported ends arranged in predetermined spaced relation to one another and adapted to engage slide-selecting contactors supported on the projector assembly boss when said magazine is assembled thereover and rotated thereabout.

13. That improvement defined in claim 12 characterized in that the top end wall of said cylindrical magazine is provided with a handgrip by which the magazine can be assembled over and lifted from said projector boss.

14. In a slide projector of the type having a slide projecting assembly and a rotary magazine support rigidly supported to one lateral side thereof, that improvement which comprises, a boss projecting vertically from said magazine support, a turntable ring journaled about the base of said boss, a slide magazine drum having a centrally-disposed downwardly-opening well shaped to fit over said boss and to be supported on said ring for rotation therewith, said magazine having slide receiving cells opening through the peripheral side wall thereof and rotatable into position for the transfer of a designated slide into said projecting assembly, and cooperating electrical contactors some of which are mounted on said boss and some in said well and adapted to be connected in a slide selection control circuit including means therein operable to rotate said magazine until a selected slide is aligned with said position for the transfer of the selected slide into the projecting assembly.

15. A slide projector as defined in claim 14 characterized in that said boss includes an annular keeper flange adapted to have interlocking engagement with cooperating detent means on slides present in said magazine, said keeper flange having a notch therein disposed in alignment with the position of said magazine for transferring a slide into and out of said slide projecting assembly and through which notch said slide detent means of a slide is freely movable.

16. A slide projector as defined in claim 14 characterized in that the contactors mounted on said boss are arranged in two rows, one of said rows having circumferentially narrow units contactors each corresponding to a different slide within a group of slides and the other of said rows having a plurality of long tens contactors each having a length corresponding generally to the combined space occupied by said units contactors, said contactors mounted on said magazine drum comprising a plurality of bridging conductors having their ends disposed in wiping contact respectively with units and tens contactors and arranged to bridge a particular pair only of said units and tens contactors in any rotary position of said magazine thereby to activate a selection control circuit for the particular slide in said magazine associated with said particular pair of bridged contactors.

17. A slide projector as defined in claim 16 characterized in that said bridging contactors are spaced apart circumferentially of said magazine by a distance corresponding approximately to the length of said tens contactors and each adapted to control the selection and transfer of a different group of slides carried within said magazine.

18. A slide projector as defined in claim 14 characterized in that said turntable ring includes an annular peripheral surface and a driven pulley engaged therewith for rotating said ring about said boss, and said ring having a separate notch therein positioned in radial alignment with each slide receiving cell of said magazine, and fast-action latch means movably supported on said projector adjacent said notches and movable into and out of engagement therewith to control stopping of said ring with a selected slide cell precisely aligned opposite the slide projecting position of said projecting assembly.

19. In an automatic slide projector, that improvement which comprises a main frame having a slide projecting assembly thereon provided with a slide receiving station, a magazine turntable on said frame disposed laterally of said slide receiving station, a slide magazine removably supported on said turntable housing a plurality of slides adapted to be transferred in random order between said magazine and said slide projecting assembly, separable means for positively locking said slide magazine to rotate with said turntable when seated thereon in any one of several different positions, means for rotating said turntable and magazine as a unit, means for locking said turntable against movement and for stopping the same precisely in any one of a plurality of predetermined positions during any particular positioning operation thereof, and means for rotating said turntable until a particular slide selected at random is accurately aligned with said slide receiving station.

20. The improvement defined in claim 19 characterized in the provision of control means operatively associated with said turntable locking means for activating said turntable rotating means as an incident to unlocking the turntable for rotation and for relocking said turntable as rotation of the turntable is discontinued.

21. An image projector device and remote control circuit for selectively transferring at random any of a plurality of image-bearing transparencies from a storage position therefor into projecting position and for returning the same back into storage position while transferring another random selected image into projecting position, said circuit including image selector means for selecting any stored image in any order, said image selector means including manually operable image selector switch means comprising a plurality of units selector switch means and a plurality of tens selector switch means and including means cooperating with one another to designate a particular image for transfer into image projecting position, means responsive to an indicated selection by said selector means to transfer the selected image into means for projecting the selected image in enlarged form onto a screen, means for locking the remaining ones of said images in storage position while any selected image is in use, and means activated by the selection of any other image to return the previously selected image to storage position and thereupon to initiate the transfer of the next selection into projecting position.

22. An image projector device and control circuit as defined in claim 21 characterized in that said image projector includes a lamp connected in said circuit, and means for discontinuing the light beam through an image while being transferred between storage and projecting positions.

23. An image projector device and control circuit as defined in claim 21 characterized in the provision of a pair of image storage means and including selector means for designating a particular one of said storage means as the one from which the next image is to be selected for projection, and said image selector being operable to cycle said control circuit to retrieve the previous image selection into its proper storage position and to advance the newly selected image to and the transfer of the selected image from the other storage means into projecting position.

24. An image projector device and control circuit as defined in claim 23 characterized in the provision of means in said control circuit for locking both image storage means immovably in place except when an image from one thereof is in an initial stage of movement toward its projecting position in said projector.

25. An image projector device and control circuit as defined in claim 23 characterized in that each of said image storage means is circular, separate power-driven rotary means supporting each of said circular storage means, and said means for locking said storage means immovably in place comprising separate solenoid-operated detent means connected in said control circuit and operatively associated with each of said storage means.

26. An image projector device and control circuit as defined in claim 21 characterized in the provision of electrically energized indicator means activated while an image is being projected onto the viewing screen and effective to identify to the audience the particular image being shown.

27. An image projector device and control circuit as defined in claim 23 characterized in the provision of image indicator means connected to said circuit and operable to inform the audience by symbol which image is being projected and including means intelligible to the projector operator for indicating from which storage means the image came.

28. In combination with a slide projector having a main frame supporting a slide projecting assembly thereon and having an upstanding circular boss offset laterally from a slide receiving slot extending crosswise of the projecting assembly, that improvement which comprises means rotatably supporting a slide magazine turntable concentrically of said boss, a circular magazine drum detachably supported on said turntable and having slide seating cells arranged radially thereof and opening through its exterior side wall, solenoid-operated stop means including a separate stop for each cell of said magazine movable between engaged and disengaged positions with respect to said turntable and the magazine mounted thereon and operable when disengaged to permit rotation of said turntable and when engaged to prevent drive of said turntable, and motor-drive means for driving said turntable when said stop means is disengaged.

29. The combination defined in claim 28 characterized in the provision of a control switch for said turntable drive motor operatively connected with said solenoid-operated stop means and arranged to energize said drive motor as said stop means is disengaged and to de-energize the motor drive as the stop means re-engages.

30. The combination defined in claim 28 characterized in that said stop means includes a pivoting pawl having a tooth engageable selectively in one of a plurality of notches of said turntable and pivoting on a stationary support spaced circumferentially from the toothed portion of said pawl, and adjustable means connecting said pawl to the operating solenoid therefor, and means normally biasing said pawl into locking engagement with one of said turntable notches.

31. The combination defined in claim 28 characterized in the provision of slide selector control means for controlling said turntable drive motor including a plurality of contactors mounted on said boss and a plurality of cooperating bridging contact means positioned to wipe over said contactors as said turntable rotates and connected in circuit with slide selector means, said contactors and bridging contact means cooperating with said slide selector means and with said turntable drive motor and the stop means therefor to position any selected slide in said magazine selected at random in transfer alignment with the slide seating slot in said projecting assembly, and means for transferring a selected slide between said magazine and said projecting assembly while said turntable remains stationary.

32. The combination defined in claims 28 characterized in that said motor drive for said turntable includes a motor having a gear wheel fixed to its driven shaft, an arm pivotal about the axis of said shaft, a shaft mounted in said arm having fixed thereto a driven gear meshing with said gear wheel, a soft-surfaced drive pulley on said last mentioned shaft positioned to engage an annular drive flange carried by said turntable, and means for biasing said drive pulley into firm frictional contact with said drive flange.

References Cited by the Examiner

UNITED STATES PATENTS

| 1,349,640 | 8/1920 | Trueblood | 88—27 |
| 2,076,924 | 4/1937 | Spindler | 88—28 X |
| 2,748,653 | 6/1956 | Pollan et al. | |
| 3,023,669 | 3/1962 | Hall | 88—28 |

OTHER REFERENCES

German application 1,109,404, Pioch, June 22, 1961.
Hairabedian: "Random Access to Slides," IBM Technical Disclosure Bulletin, vol. 3, No. 2, page 15, July 1960.

NORTON ANSHER, *Primary Examiner.*

WILLIAM MISIEK, *Examiner.*